United States Patent [19]

Asayama

[11] Patent Number: 5,161,632
[45] Date of Patent: Nov. 10, 1992

[54] TRACKING CONTROL DEVICE FOR A VEHICLE

[75] Inventor: Yoshiaki Asayama, Himeji, Japan

[73] Assignee: Mitsubishi Denki K.K., Tokyo, Japan

[21] Appl. No.: 696,811

[22] Filed: May 7, 1991

[30] Foreign Application Priority Data

Jun. 1, 1990 [JP] Japan .................................. 2-145120
Dec. 19, 1990 [JP] Japan .................................. 2-403779

[51] Int. Cl.$^5$ ........................ B62D 6/00; B60K 31/02
[52] U.S. Cl. ................................. 180/167; 180/178;
340/435; 358/103; 364/424.01
[58] Field of Search ............... 180/167, 168, 169, 175,
180/179, 178, 170; 358/103, 105; 364/424.01;
340/435; 356/28

[56] References Cited

U.S. PATENT DOCUMENTS

| | | | |
|---|---|---|---|
| 3,011,580 | 8/1961 | Reid .................... | 180/169 |
| 4,703,429 | 10/1987 | Sakata ................. | 180/169 |
| 4,706,195 | 11/1987 | Yoshino ............... | 180/169 |
| 4,926,346 | 10/1990 | Yokoyama .......... | 364/518 |
| 4,931,937 | 6/1990 | Kakinami et al. ..... | 364/424.01 |
| 5,023,712 | 6/1991 | Kajiwara .............. | 358/105 |
| 5,053,979 | 10/1991 | Etoh .................... | 180/169 |
| 5,081,585 | 1/1992 | Kurami et al. ....... | 358/103 |

FOREIGN PATENT DOCUMENTS

| | | |
|---|---|---|
| 354562 | 2/1990 | European Pat. Off. . |
| 3642196 | 6/1988 | Fed. Rep. of Germany . |
| 2521080 | 8/1983 | France . |
| 239900 | 11/1985 | Japan . |
| 1-35305 | 7/1989 | Japan . |

*Primary Examiner*—David M. Mitchell
*Attorney, Agent, or Firm*—Sughrue, Mion, Zinn, Macpeak & Seas

[57] ABSTRACT

A tracking control device for a vehicle which is composed of:
  image sensors for taking images of a foregoing car through optical systems;
  a display device for displaying the images taken by the image sensors;
  a window forming device for forming an image tracking window in the display device;
  an image tracking instruction input device operable by a first outside operation;
  an image tracking device for tracking the image of the preceding car operated by an operational input of the image tracking instruction input device when the image of the preceding car enters in the window;
  inter-vehicle distance detecting device for detecting an inter-vehicle distance between a driving car and the preceding car;
  tracking instruction input device operable by a second outside operation; and
  speed controlling device for controlling speed of the driving car operated by an operational input of the tracking instruction input device by receiving an output of the inter-vehicle distance detecting device so that the inter-vehicle distance between the driving car and the preceding car becomes a predetermined value.

3 Claims, 4 Drawing Sheets

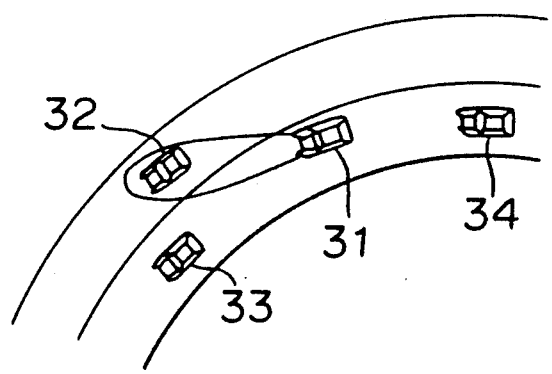
FIGURE 1
FIGURE 3
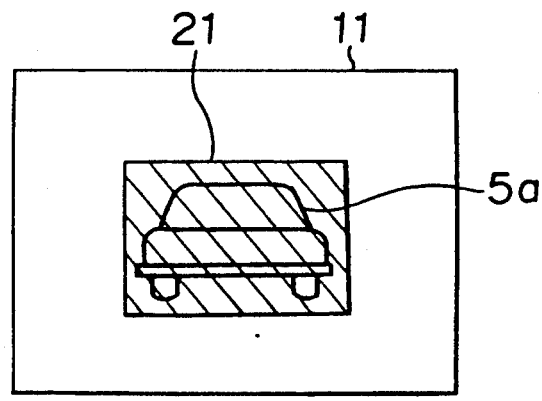
FIGURE 4
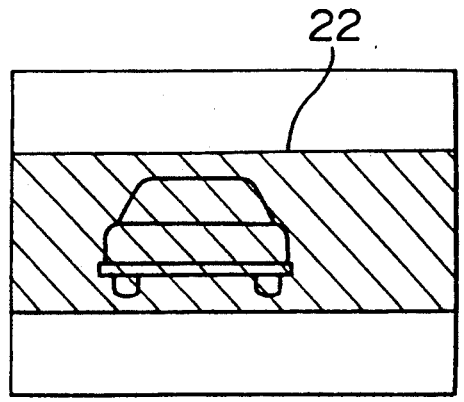
Image in the memory 8
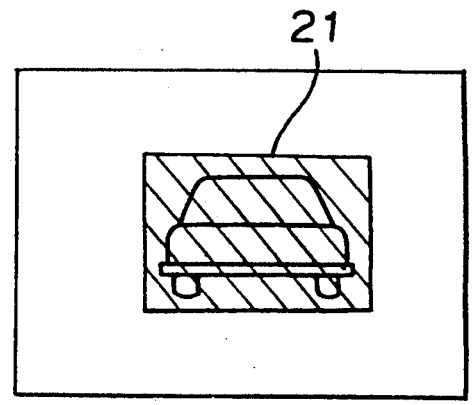
Image in the memory 9

TRACKING CONTROL DEVICE FOR A VEHICLE

BACKGROUND OF THE INVENTION

This invention relates to a tracking control device for a vehicle capable of controlling a vehicle speed by which a driving car follows a preceding car, while maintaining a safe inter-vehicle distance, and particularly to a tracking control device for a vehicle capable of accurately detecting the inter-vehicle distance between the driving car and the preceding car by tracking an image of the preceding car which the driving car follows.

The conventional tracking control device for a vehicle of this kind is disclosed in bath Japanese Unexamined Patent Publication No. 86000/1980 and 239900/1985, in which a radar device, utilizing light or electromagnetic wave is installed at the front part of a car, that detects a preceding car by monitoring the front direction of the car, calculates the relative distance to the preceding car, and controls the speed of the driving car so that the inter-vehicle distance between the driving car and the preceding car becomes a safe inter-vehicle distance. However, in the above conventional device, since the preceding car is detected by the radar device installed at the front part of the driving car, for instance, as shown in FIG. 1, in driving on a curve, a car 32 in a passing lane may enter in the detection area of the above radar device mounted on the driving car 31. Therefore, when the car in the passing lane 32 moves faster than the flow of vehicles in a driving lane, the driving car rapidly approaches the preceding car 33 in the driving lane because the driving car 31 attempts to maintain an inter-vehicle distance from the detected car 32. When the car 32 moves slower than the flow of the vehicles in the driving lane, the driving car in the driving lane may be rapidly approached by the succeeding car 34 in the driving lane.

Furthermore, since the preceding car 32 which the driving car follows detecting the inter-vehicle distance, is not identified when a plurality of cars are running, the driver does not know to which car the driving car is following, which causes anxiety to the driver.

SUMMARY OF THE INVENTION

It is an object of this invention to provide a tracking control device for a vehicle capable of certainly following the preceding car which the driver determines and recognizing the car which the driving car follows, in case that a plurality of cars are running.

According to an aspect of the present invention, there is provided a tracking control device for a vehicle which comprises: image sensors for taking images of a preceding car through optical systems; display means for displaying the images taken by the image sensors; window forming means for forming an image tracking window in the display means; image tracking instruction input means operable by a first outside operation; image tracking means for tracking the image of the preceding car operated by an operational input of the image tracking instruction input means when the image of the car enters in the window; inter-vehicle distance detecting means for detecting an inter-vehicle distance between a driving car and the preceding car; tracking instruction input means operable by a second outside operation; and speed controlling means for controlling speed of the driving car operated by an operational input of the tracking instruction input means by receiving an output of the inter-vehicle distance detecting means so that the inter-vehicle distance between the driving car and the preceding car becomes a predetermined value.

According to another aspect of the present invention, there is provided a tracking control device of a vehicle which comprises: a couple of image sensors for tracking an image of a preceding car disposed top and bottom; displaying means for displaying one of a top image and a bottom image taken by the couple of image sensors; an image tracking window which can be set at a predetermined position in the displaying means; an image tracking instruction switch operable by a driver; image tracking means for tracking an image of the preceding car operated by the image tracking instruction switch when an image of the preceding car enters in the image tracking window; inter-vehicle distance detecting means for detecting an inter-vehicle distance between the driving car and the preceding car by electrically detecting a deviation between the corresponding top and bottom images based on the image in the image tracking window; a tracking switch; speed controlling means for controlling a speed of the driving car operated by the tracking switch by receiving an output of the inter-vehicle distance detecting means, so that the inter-vehicle distance between the driving car and the preceding car becomes a predetermined value; and running direction controlling means for controlling the running direction of the driving car corresponding to a horizontal movement of the image tracking window which tracks the image of the preceding car.

BRIEF DESCRIPTION OF THE INVENTION

A more complete appreciation of the invention and many of the advantages derived therefrom will be readily obtained as the same becomes better understood by reference to the following detailed description when considered in connection with the accompanying drawings, wherein:

FIG. 1 is an explanatory diagram showing a running state of the vehicle on which a conventional device is mounted;

FIG. 3 is an explanatory diagram showing a display of a display device in which an image of a preceding car enters and an image tracking window is set;

FIG. 4 is an explanatory diagram showing the image domain which is compared with a standard image in the window.

DETAILED DESCRIPTION OF THE INVENTION

Figure 2:
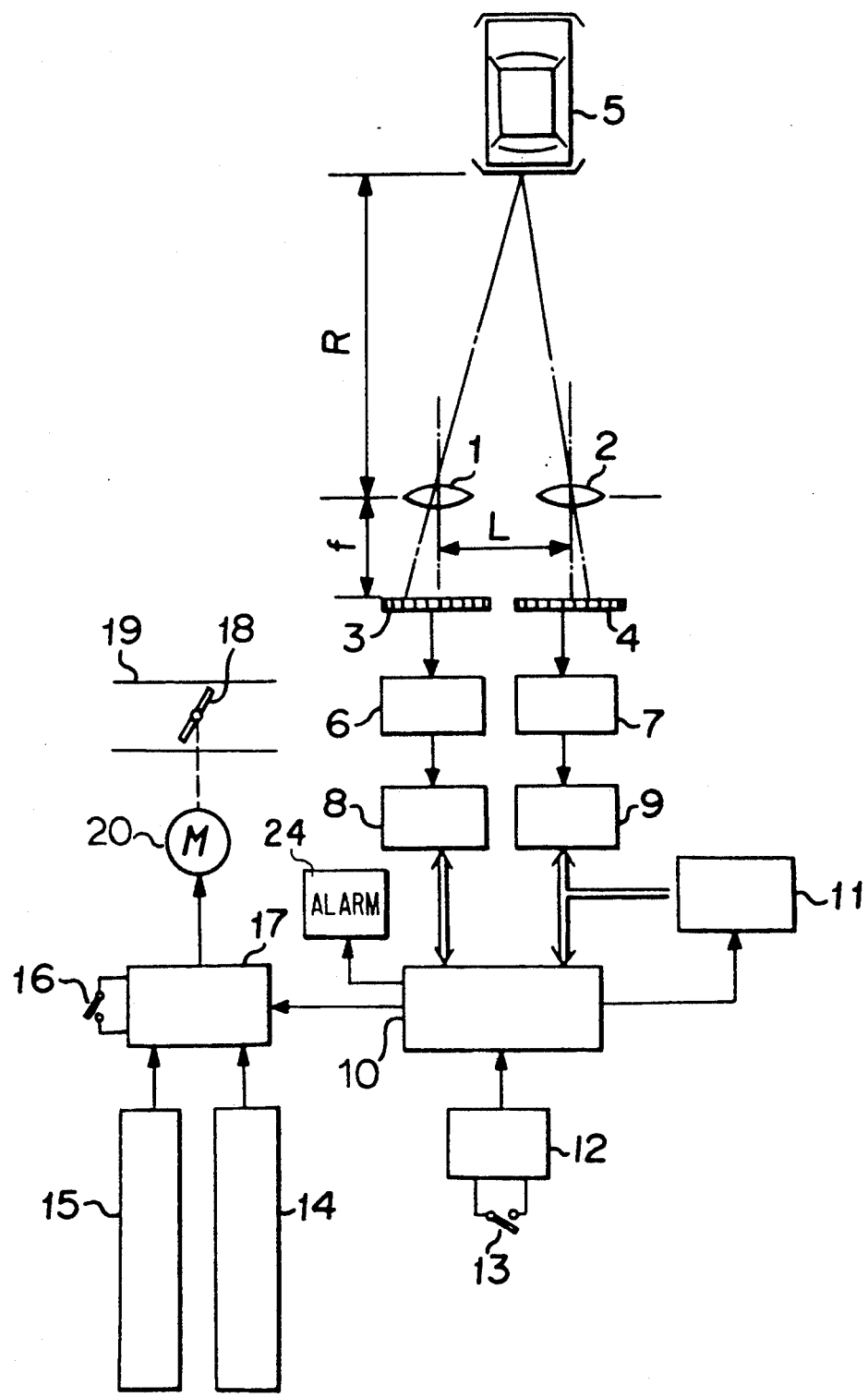
FIG. 2 is a construction diagram showing an embodiment of the tracking control device for the vehicle according to the present invention.

A first embodiment of this invention is explained below. In FIG. 2, numerals 1 and 2 signify lenses which constitute left and right optical systems, numerals 3 and 4, two-dimensional image sensors installed corresponding to the lenses 1 and 2, respectively, and a numeral 5, a preceding car to be followed. Numerals 6 and 7 signify analog/digital (A/D) convertors which convert the respective outputs of the image sensors 3 and 4 to digital signals, numerals 8 and 9, memories connected to the output side of the A/D convertors 6 and 7, and a microcomputer 10, a numeral 11, a display device which shows an image taken by the right hand side image sensor 4, which is controlled by the microcomputer 10. A numeral 12 signifies a window forming device for forming a window for image tracking, and a numeral 13, an image tracking instruction switch operated by a driver, of which signal is to be inputted to the window forming device 12. A numeral 14 signifies a brake switch which detects the operation of a brake pedal by the driver, a numeral 15, a vehicle speed sensor which detects a vehicle speed, a numeral 16, a tracking switch operated by the driver, and a numeral 17, a speed control device of the driving car, which receives the output signal of the brake switch 14, the vehicle speed sensor 15, and the tracking switch 16. The microcomputer 10 is connected to the memories 8 and 9, receives the signal from the window forming device 12, sets the window in the display device 11, and outputs an inter-vehicle distance signal to the speed control device 17. A numeral 18 signifies a throttle valve installed at the suction pipe 19 of the engine, which is opened and closed by the motor 20 driven by the speed control device 17.

In the above construction, FIG. 3 shows a display of the display device 11. For instance, when the image 5a of the preceding car 5, which the driver wants to track, enters in the image of the right hand side image sensor 4, which is displayed in the display device 11, the driver sets the image tracking window 21 encircling or surrounding the preceding car image 5a by operating the window forming device 12. When the driver successively operates the image tracking instruction switch 13, in spite of the movement of the car image 5a in the display of the display device 11, the window 21 follows the preceding car image 5a, and image tracking operation of the car image 5a by the window 21 is automatically performed. This image tracking operation is similar to that of the conventional devices which are disclosed in Japanese Examined Patent Publication No. 33352/1985, or in Japanese Examined Patent Publication No. 35305/1989.

Furthermore, the image of the preceding car 5 is formed on the left and right image sensors 3 and 4 through the left and right lenses 1 and 2 as respective optical images. The analog photoelectric conversion signals corresponding to the above optical images which are outputted from the image sensors 3 and 4, are converted from analog to digital form by the A/D convertor 6 and 7, respectively, and stored in the memories 8 and 9, respectively. The microcomputer 10 receives the image signals of the preceding car 5a from the memory 9 and displays the image signal on the display device 11. Also, the microcomputer 10 displays a window signal inputted from the window forming device 12 on the display device 11 as the window 21.

Next, explanation will be given of the inter-vehicle distance detecting method between the driving car and the preceding car. First of all, the microcomputer 10 reads the image elements of the window 21 which is tracking the preceding car image 5a, from the memory 9, and determines it as a reference image signal for the calculation of the inter-vehicle distance. The microcomputer 10 selects the domain corresponding to the above window 21 in the memory 8 which memorizes the image signal of the left-hand side image sensor 3, shifts the image signal of the memory 8 with respect to the above reference image signal, element by element, and calculates the summation of the absolute value of the difference of signals at every horizontal element. Therefore, the position of the image which fits the most or best agrees with the image in the window 21, is obtained by shifting the image successively element by element. At this time, the image in the memory 8 at the left-hand side diagram corresponds to the domain 22, which is related to the reference image signal in the window 21 in the memory 9 at the right hand side diagram, as shown in FIG. 4. This domain 22 corresponds to the domain in the window 21 which is elongated to full horizontal length of the display.

As stated above by comparing the left and right elements, and assuming that the shift quantity of the element which minimizes summation of the absolute value of the difference signal is "n" image element, the pitch p of the image element, the base length L between the optical systems, the focal length f of the lenses 1 and 2, and the distance R to the preceding car 5, R, R is obtained by the equation $R = f \cdot L / n \cdot P$.

In this way, with respect to the once determined preceding car 5, even when the preceding car 5 moves left or right, the inter-vehicle distance from the driving car to the preceding car can be continuously detected by tracking it.

As stated above, after the image tracking of the preceding car 5 is started, and when the tracking switch 16 is operated by the driver, the speed control device 17 receives an inter-vehicle distance detect signal from the microcomputer 10, and compares the inter-vehicle distance with a predetermined safe inter-vehicle distance corresponding to a speed of the driving car which is inputted from the vehicle speed sensor 15. When the inter-vehicle distance R to the preceding car 5, is shorter than the above safe inter-vehicle distance, the microcomputer rotates the motor 20 so that a throttle valve 18 is driven to the closed side. When the inter-vehicle distance R to the car is longer than the above safe inter-vehicle distance, the microcomputer opens the throttle valve 18. In this way, the speed of the driving car is controlled. As a result, inter-vehicle distance R is controlled so as to maintain the above safe inter-vehicle distance, and the driving car tracks the preceding car 5 while maintaining the above safe inter-vehicle distance.

It should be noted that when the image of the preceding car taken by the image sensors 3 and 4 gets dark, e.g., when the driving car enters a tunnel while running in the above tracking way, the image tracking may become impossible against the intention of the driver At this time, it is desirable to inform the driver by an alarm 24 such as a buzzer or the like that the image tracking becomes impossible, and to maintain a running of the driving car at a vehicle speed when the image tracking becomes impossible, so that a driver is not perplexed by the abrupt stoppage of the above tracking control. The above tracking control is stopped by an output of the brake switch 14 which is operated by a braking operation of the driver, or by the release of the tracking switch 16.

Figure 5:
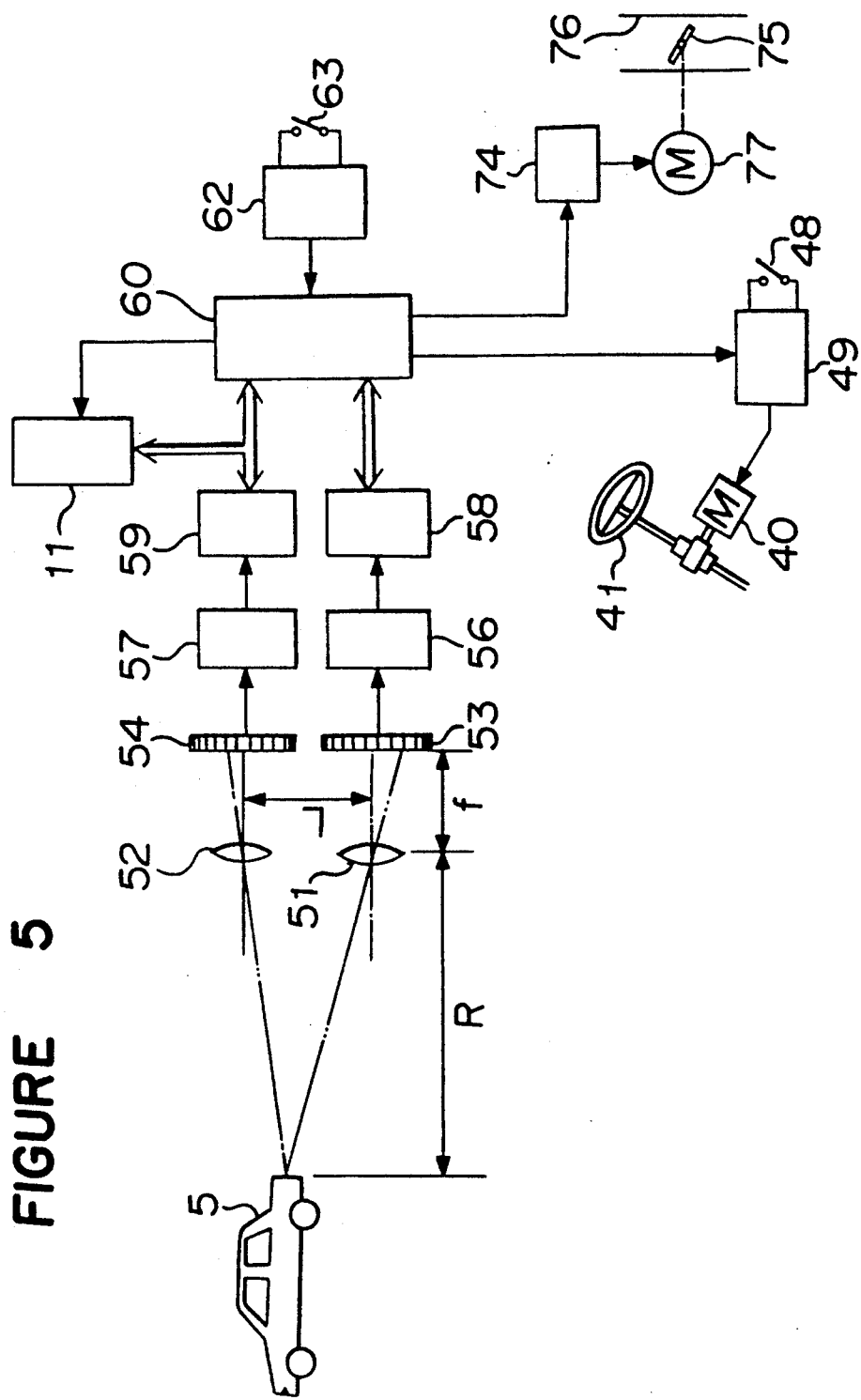
FIG. 5 is a construction diagram of a second embodiment of a tracking control device for a vehicle according to the present invention.

Explanation will be given to a second embodiment of the invention, referring to the drawings. FIG. 5 is a construction diagram showing a second embodiment of the tracking control device for a vehicle according to the present invention. In FIG. 5, numerals 51 and 52 signify a pair of lenses which constitute top and bottom optical systems for taking the images of a preceding car in front of a driving car, numerals 53 and 54, two-dimensional image sensors installed corresponding to the lenses 51 and 52, respectively, a numeral 5, the preceding car to be tracked, numerals 56 and 57, A/D converters, numeral 58 and 59, memories, a numerals 60, a microcomputer, a numeral 11, a display device which displays an image taken by the top side image sensor 54, controlled by the microcomputer 60, a numeral 62, device which forms a window for image tracking, numeral 63, an image tracking instruction switch which is operated by a driver, a numeral 74, a speed control device of the driving car, and a numeral 75, a throttle valve of the engine 76, which is opened and closed by the motor 77. A numeral 48 signifies a tracking switch operated by the driver, a numeral 49, a running direction control device of the driving car, and a numeral 40, a motor which drives the steering device 41 of the driving car.

Next explanation will be given to the operation of device. When the image of the preceding car 5a which the driver wants to track, enters in, for instance, the top side image sensor 4, and is displayed in the display device 11, as shown in FIG. 3, the driver sets the image tracking window 21 encircling the preceding car image 5a by operating the window forming device 62. In spite of the movement of the preceding car image 5a in the display of the display device 11, the window 21 moves following that, the image tracking operation of the preceding car image 5a is automatically performed by the window 21. This image tracking operation is similar to the conventional device, as mentioned before, which are disclosed in Japanese Examined Patent Publication No. 33352/1985 or in Japanese Examined Patent Publication No. 35305/1989.

Figure 6:
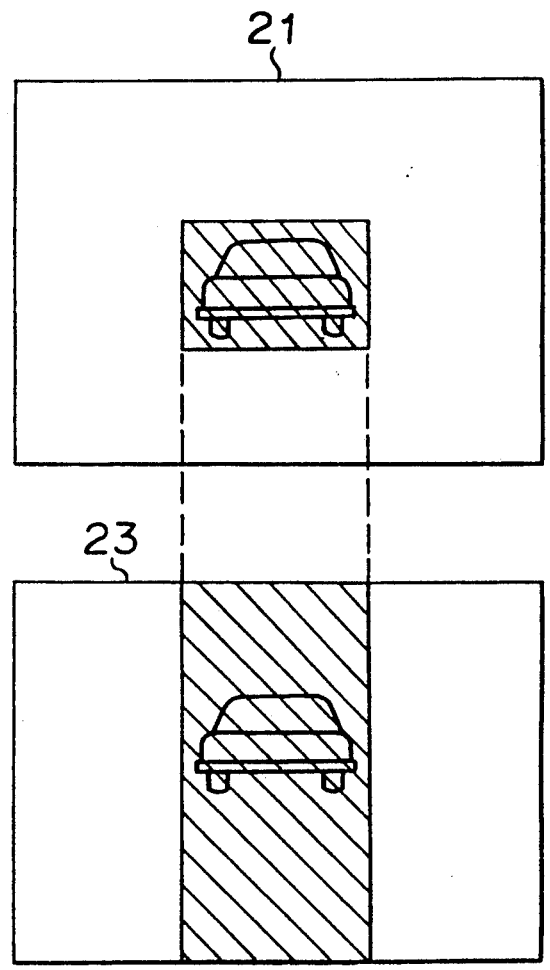
FIG. 6 is an explanatory diagram showing the image domain which is compared with a standard image in the window.

Next, explanation will be given to the method of the inter-vehicle distance detection between the driving car and the preceding car. First of all, the microcomputer 60 reads the image element signal in the window 21 which is tracking the preceding car image 5a, and makes it as the reference image signal for the calculation of the inter-vehicle distance. The microcomputer 60 selects the domain corresponding to the window 21 in the memory 58, in which the image signal of the bottom-side image sensor 23 is memorized, and calculates the summational absolute value of the difference of the signal at every vertical image element, by shifting the image signal of the memory 58 with respect to the above reference image signal, element by element. Accordingly, the position of the image which fits the most or best agrees with the image in the window 21, is obtained by shifting the image element by element. At this time, the domain which is related to the calculation, as shown in FIG. 6, with respect to the reference image element signal in the window 21, is the domain 23 for the image in the memory 8. As mentioned above, by comparing top and bottom elements, and assuming that the shift quantity of the image element which minimizes the summation of the absolute value of the difference signal, is "n" image elements, the pitch p of the image element, the base length L between the lenses 1 and 2, the focal length f of the lenses 1 and 2, and distance R to the foregoing car 5, is obtained by the following equation $$R = f \cdot L / n \cdot P$$

As stated above, with respect to the once determined preceding car, even when the preceding car moves to the right and the left, the inter-vehicle distance between the driving car and the preceding car may continuously be detected by tracking it. Furthermore, the preceding car image 5a is disposed almost at the center of the display of the display device 11. However in a curved lane, the preceding car image 5a moves to the direction of the curve. At the same time, the window 21, which tracks the preceding car image 5a, moves to the left or the right in the display according to the direction of the car. The running direction of the preceding car 5 is calculated by the microcomputer 60, by detecting a horizontal number of element of movement of the window 21.

As stated above, after the image tracking of the preceding car is started, and when the tracking switch 48 is operated by a driver, the running direction control device 49 receives a running direction signal which is calculated by the microcomputer 60, drives the steering device 41 through the motor 40 so that the driving car follows the preceding car, and controls the running direction. Accordingly, the running direction of the driving car is controlled so that the window 21 which tracks the preceding car 5, is always disposed at the center of the display. On the other hand, the speed control device 74 receives an inter-vehicle distance detect signal from the microcomputer 60, compares the inter-vehicle distance with a predetermined safe inter-vehicle distance, drives the throttle valve 75 to the closed side by rotating the motor 77 when the inter-vehicle distance R to the preceding car 5 is shorter than the safe inter-vehicle distance, and opens the throttle valve 75 when it is longer than the safe inter-vehicle distance. In this way the speed of the driving car is controlled. As a result, the inter-vehicle distance R is controlled to the safe inter-vehicle distance, and the driving car follows the preceding car 5, while maintaining the safe inter-vehicle distance.

As mentioned above, according to the invention, the preceding car to be tracked is indicated by the image tracking window. The preceding car is tracked by the image, and inter-vehicle distance between the driving car and the preceding car, is detected. And the speed of the driving car is controlled so that the inter-vehicle distance becomes a predetermined safe inter-vehicle distance by the operational input of the tracking instruction. Therefore even when a plurality of preceding cars are running, the driver can track the preceding car while always maintaining the safe inter-vehicle distance.

Furthermore, since a preceding car image is displayed by the display means, the driver can accurately indicate the preceding car to be tracked, which eliminates the anxiety of the driver who does not know which preceding car is being tracked, as in the conventional device.

Furthermore, as explained above, since this invention is composed of, at least two image sensors disposed top and bottom, an image tracking window, the inter-vehicle distance detecting means which detects the inter-vehicle distance between the driving car and the preceding car by the deviation between the top and bottom corresponding images based on an image in the window, speed controlling means which controls the speed of the driving car based on the inter-vehicle distance signal detected by the detecting means, and running direction controlling means for controlling the running direction of the driving car corresponding with a horizontal movement of the window, the driver can track the preceding car while always maintaining the safe inter-vehicle distance, even when a plurality of cars are driving. Also, since the preceding car image and the window are displayed, the driver can certainly indicate the preceding car to be tracked, which eliminates the anxiety of the driver who does not know which car is being tracked, as in the conventional device.

I claim:

1. A tracking control device for a driving car which comprises:
    image sensors for taking images of a preceding car through optical systems;
    display means for displaying the images taken by the image sensors;
    window forming means for forming an image tracking window in the display means;
    image tracking instruction input means responsive to a first external operation;
    image tracking means for tracking the image of the preceding car operated by an operational input of the image tracking instruction input means when the image of the preceding car enters in the window;
    inter-vehicle distance detecting means for detecting an inter-vehicle distance between the driving car and the preceding car;
    tracking instruction input means responsive to a second external operation; and
    speed controlling means for controlling speed of the driving car operated by an operational input from the tracking instruction input means by receiving an output of the inter-vehicle distance detecting means so that the inter-vehicle distance between the driving car and the preceding car becomes a predetermined value, wherein an alarm alerts the driver when the image sensors cannot take images of the preceding car, and in response to the alarm, the speed controlling means maintains the current speed of the car at the time the alarm went off, said speed control is terminated when the second external operation is not received by said tracking instruction input means, or when a brake switch is activated in response to the driver operating the brake of the driving car.

2. A tracking control device for a driving car which comprises:
    at least two image sensors for tracking an image of a preceding car, each disposed top and bottom from one another;
    displaying means for displaying one of a top image and a bottom image taken by the image sensors;
    an image tracking window set at a position in the displaying means;
    an image tracking instruction switch;
    image tracking means for tracking an image of the preceding car in response to the image tracking instruction switch when an image of the preceding car enters in the image tracking window;
    inter-vehicle distance detecting means for detecting an inter-vehicle distance between the driving car and the preceding car by electrically detecting a deviation between the corresponding top and bottom images based on the image in the image tracking window;
    a tracking switch;
    speed controlling means for controlling a speed of the driving car by receiving an output of the inter-vehicle distance detecting means, so that the inter-vehicle distance between the driving car and the preceding car becomes a predetermined value; and
    running direction controlling means for controlling the running direction of the driving car, in response to said tracking switch, in accordance with a movement of the image tracking window which tracks the image of the preceding 3. The tracking control device of claim 2, wherein said running direction controlling means is coupled to the steering mechanism of the driving car and controls the lateral movement of the driving car in proportion to the horizontal deviation of the window containing the image of the preceding car from the center of a display screen of said displaying means.

* * * * *